(12) United States Patent
Hoppert (10) Patent No.: US 7,918,469 B2
(45) Date of Patent: Apr. 5, 2011

(54) ADJUSTABLE TRACTION BLOCK

(76) Inventor: David John Hoppert, Woodburn, OR (US)

( * ) Notice: Subject to any disclaimer, the term of this patent is extended or adjusted under 35 U.S.C. 154(b) by 465 days.

(21) Appl. No.: 12/072,400

(22) Filed: Feb. 25, 2008

(65) Prior Publication Data

US 2009/0212510 A1    Aug. 27, 2009

(51) Int. Cl.
  *B60G 1/00*    (2006.01)
(52) U.S. Cl. ..... 280/124.102; 280/124.11; 280/124.128; 280/124.174
(58) Field of Classification Search .......... 280/124.101, 280/124.102, 124.104, 124.11, 124.128, 280/124.129, 124.164, 124.17, 124.174, 280/124.175, 124.165; 267/48, 228, 229, 267/242, 66, 67, 68
See application file for complete search history.

(56) References Cited

U.S. PATENT DOCUMENTS

| | | | | |
|---|---|---|---|---|
| 2,852,248 A * | 9/1958 | Travilla et al. | ................. | 267/67 |
| 3,406,957 A * | 10/1968 | Almquist, Jr. | ................. | 267/67 |
| 3,591,197 A * | 7/1971 | Haley | ............................. | 280/682 |
| 3,695,605 A * | 10/1972 | Grossi | .............................. | 267/66 |
| 3,788,629 A * | 1/1974 | Johnson | .......................... | 267/66 |
| 3,902,734 A * | 9/1975 | Fier | ................................ | 280/799 |
| 4,033,609 A * | 7/1977 | Malcolm | .................... | 280/86.75 |
| 4,098,523 A * | 7/1978 | Valerio | .................. | 280/124.104 |
| 4,141,428 A * | 2/1979 | Loeb | ............................. | 180/349 |
| 4,282,945 A * | 8/1981 | Bessey | ........................... | 180/345 |
| 5,354,092 A * | 10/1994 | Calvert | .................. | 280/124.102 |
| 5,470,096 A * | 11/1995 | Baxter | ................... | 280/124.116 |
| 6,234,502 B1* | 5/2001 | Sobina | ................... | 280/124.163 |
| 6,386,565 B1* | 5/2002 | Kugler | ................... | 280/124.165 |
| 6,571,903 B2* | 6/2003 | Brissette et al. | .............. | 180/352 |
| 7,360,778 B2* | 4/2008 | Smith | ...................... | 280/124.17 |
| 2005/0269796 A1* | 12/2005 | Sawarynski et al. | ... | 280/124.174 |
| 2006/0076749 A1* | 4/2006 | Hoppert | .................... | 280/124.17 |
| 2007/0085293 A1* | 4/2007 | Smith | ...................... | 280/124.17 |

* cited by examiner

*Primary Examiner* — Paul N. Dickson
*Assistant Examiner* — Barry Gooden, Jr.
(74) *Attorney, Agent, or Firm* — Mark S. Hubert (57) ABSTRACT

A single unit that combines the advantages of a rear spring spacer block and a traction bar. The rigidity of the traction bar and design of the spacer block eliminate wheel hop and axle wrap while maintaining a level vehicle drive height. No welding is required to install the device, the device is length and height adjustable for a plethora of vehicle applications and the factory ride and handling are preserved.

11 Claims, 8 Drawing Sheets

ADJUSTABLE TRACTION BLOCK

BACKGROUND OF THE INVENTION

Often today, Light trucks, Sport Utility Vehicles, and more, can be seen sitting atop towering truck suspension lift kits. Aftermarket speciality suspension systems that raise the vehicle's body not only make a style statement but also allow for higher ground clearance and larger tire placement. The problem with installing suspension lift kits, is that vehicle performance and handling can be severely impacted.

Drivers of these vehicles have come to expect a smooth ride while maintaining the ability to tow heavy loads or jump obstacles. Industry has responded to consumer demand by reducing the spring rate of the leaf springs to provide the desired smoother ride.

Unfortunately, axle wrap is a problem that often plagues soft leaf sprung vehicles. Additionally, the problem of axle wrap and the resulting wheel hop are compounded by lift kits that increase the distance between the axle and the springs. Axle wrap is one of the biggest concerns with a spring over axle lift.

Axle wrap occurs when the torque on the axle tube tries to rotate the axle pinion up when under power. This twist causes the leaf springs to twist up into an 'S' shape then snap back to it's standard configuration when the counter torque developed by the deformed spring exceeds that of the spinning tires, which leads to loss of traction, wheel hop, and all too often broken parts. With a spring over axle lifted vehicle, axle wrap (also called spring wrap) is usually worse because there is more leverage (due to the increase in distance between the axle and springs) for the twisting axle to work against the springs.

This new invention utilizes and combines both known and new technologies in a unique and novel configuration to fulfill an industry need and overcome the aforementioned problems of "axle wrap." It utilizes a stiffened, telescoping adjustable set of traction members pivotally coupled to a height selected set of spacer blocks, that may be affixed to the vehicle between the spring assembly and the axle mount.

SUMMARY OF THE INVENTION

The general purpose of the present invention, which will be described subsequently in greater detail, is to provide a single, adjustable, suspension system capable of eliminating axle wrap and wheel hop while maintaining a level vehicle drive height for a multitude of different vehicle length applications. The present invention advantageously links the traction bar devices pivotally to a single axle spacer block (available in the various commercial heights) and removes the need for axle welding or the stacking of lift blocks. The spacer block section utilizes interchangeable plates that allow for the vertical adjustment of the vehicle's axle with respect to the spring assembly for further suspension/driveline tuning. Additionally, the invention is inexpensive to manufacture, adaptable to a plethora of different vehicles, sturdy, and requires no welding by the consumer to adjust and mount to the vehicle.

It has many of the advantages mentioned heretofore and many novel features that result in a new improved adjustable vehicle traction bar which is not anticipated, rendered obvious, suggested, or even implied by any of the prior art, either alone or in any combination thereof.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

The present invention provides an adjustable rear suspension device that provides vehicle owners a single product that replaces the need for purchasing an adjustable traction bar and a rear axle spacer; it allows a vehicle to keep a level ride height while limiting axle wrap and wheel hop and can be length adjusted for different truck cab, and box configurations. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 1:
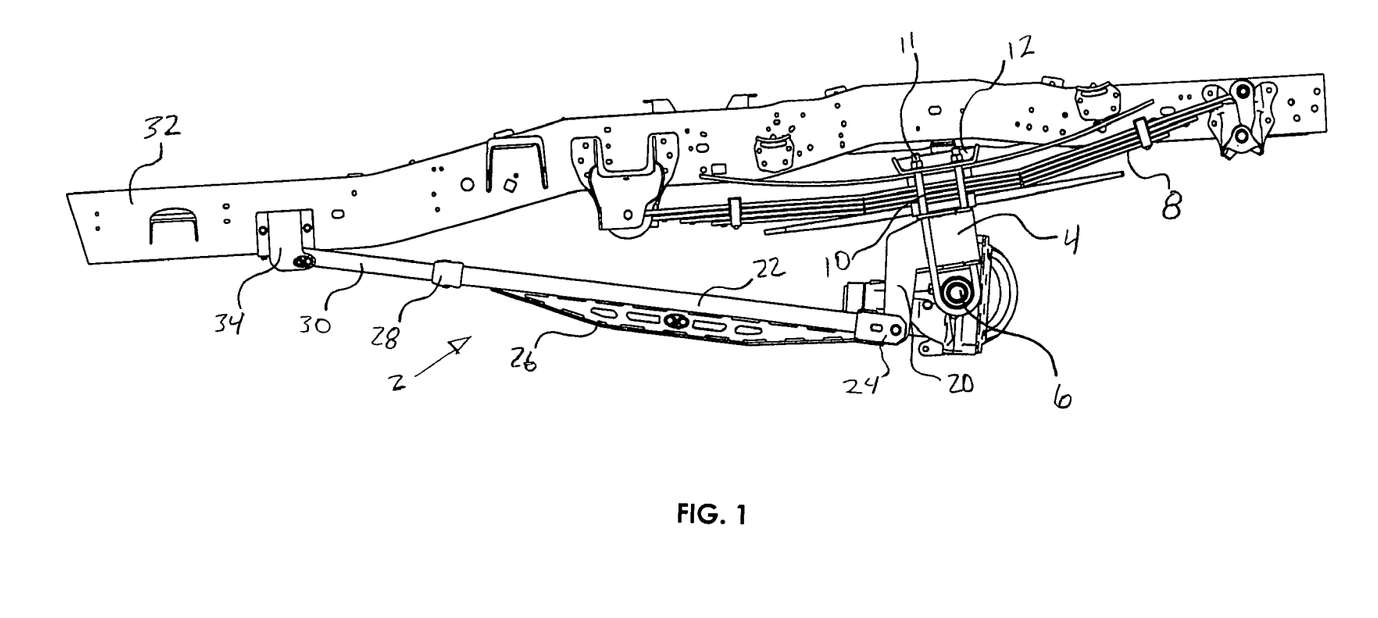
FIG. 1 is a side view of the preferred embodiment mounted to a vehicle.

Referring now to FIG. 1., a side view of the preferred embodiment of the traction block assembly 2, the general arrangement of all the components can be seen. A traction block 4 resides between the axle 6 and leaf spring assembly 8. Two U-bolts 10 (only one U-Bolt 10 is visible in FIG. 1) secure the traction block 4 around the leaf spring assembly 8. The U-bolts pass around the axle 6 through orifices in the traction block 4 (not visible) and around the leaf spring assembly 8 and are finally secured via the upper bump-stop U-bolt bracket 12 with a standard washer and nut assembly 11. Additionally, the upper bump-stop U-bolt bracket 12 contains four upper bump-stop mounting orifices 3 and a receiving orifice 13 (See FIG. 3) to accommodate the spring pin (not shown.) The spring pin extends from the bottom side of the lowermost spring and positions the spring assembly with respect to the upper bump-stop U-bolt bracket 12. The bracket arm 20, is connected to the outer traction tube 22 via the traction tube mount 24. Also visible is the gusset plate 26 on outer traction tube 22. The clamping coupler 28 couples the outer traction tube 22 to the inner traction tube 30. The inner traction tube 30 mounts to the vehicle frame 32 via the frame bracket 34. Since the inner traction tube 30 and the outer traction tube 22 form a telescoping assembly, the gusset plate is a linear stiffening member to strengthen the hollow outer traction tube 22.

Figure 2:
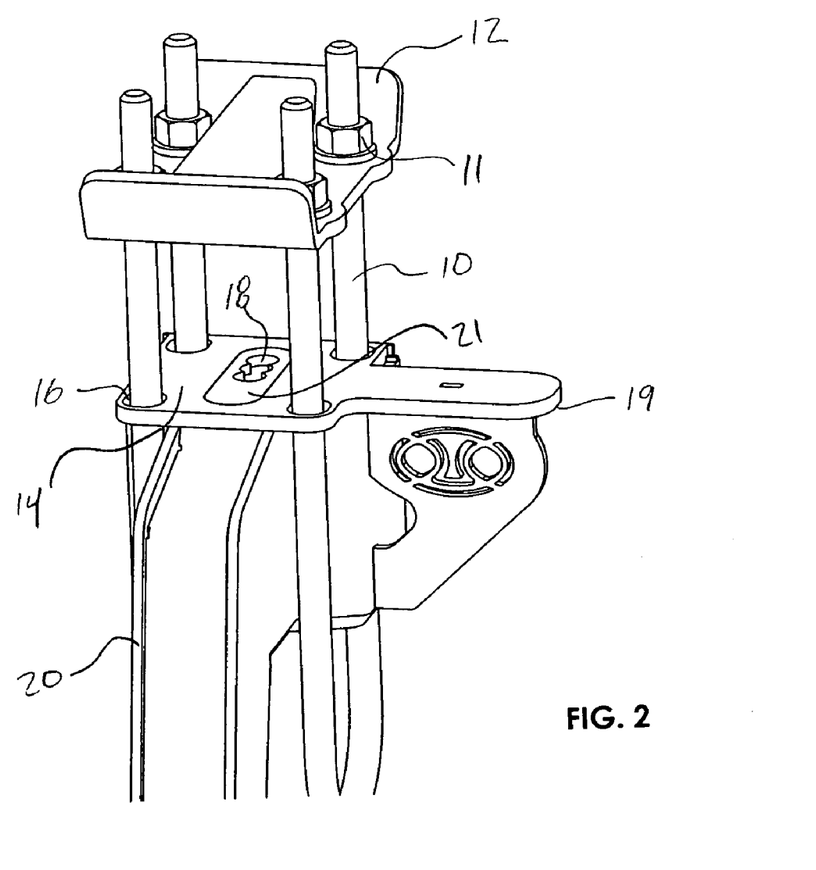
FIG. 2 is a partial top perspective view of the traction block, bracket arm, top plate, upper bump-stop U-bolt bracket, and U-bolts.

Referring now to FIG. 2, the traction block 4 has an "L" shaped, boxed or generally enclosed construction. In the preferred embodiment, the top plate 14 of traction block 4 has four slightly elongated mounting orifices 16 for receiving the U-bolts 10. A removable and interchangeable spring pin adjustment plate 21 contains three spring pin adjustment orifices 18. The top plate 14 contains a chamfered orifice (not pictured) dimensionally sized to accept one of the spring pin adjustment plates 21, such that when the spring pin adjustment plate 21 is set into the chamfered orifice the top plate 14 remains a planar surface. Adjustable pin placement through the spring pin adjustment orifices 18 allows the rear axle to be positioned more forward, which can advantageously alter the drive line length as well as allows for a greater clearance between the tire and the back of the rear fender. The bump stop pad 19 is also visible. The traction block 4 is connected to the proximate end of the traction tube assembly 40 by a bolted assembly passing through the traction tube mount 24, which is a "C" shaped bracket, comprised of two side plates 52 and two traction tube assembly mounting orifices 50. In this way the height of the traction block 4 can be selected from any of a series of incrementally higher traction blocks 4.

Figure 3:
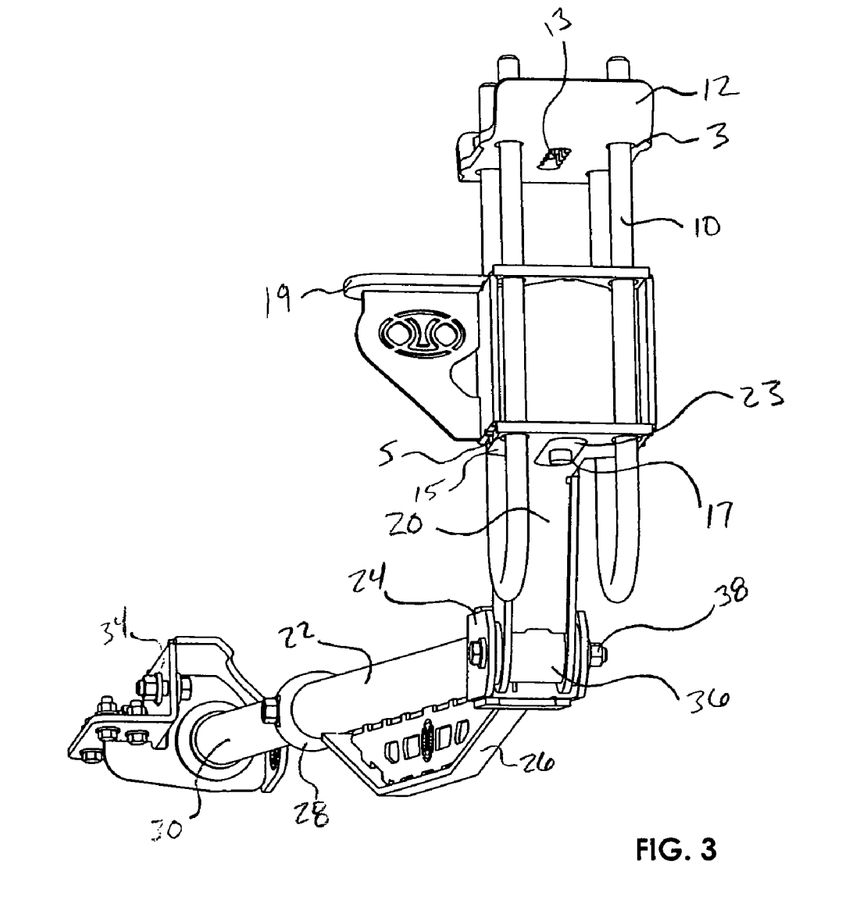
FIG. 3 is an axle end perspective view of the preferred embodiment.

In FIG. 3 the bottom plate 15 of the traction block 4 can be seen. Bottom plate 15 is parallel with the top plate 14 and contains two bottom plate mounting orifices 5, a second chamfered orifice (not pictured) dimensionally sized to accept a peg adjustment plate 23 such that when the peg adjustment plate 23 is set into the second chamfered orifice the bottom plate 15 remains a planar surface. A peg 17 extends normally from the peg adjustment plate 23. The peg 17 is dimensionally sized to be received within an axle mounting plate (not shown), which is mechanically affixed to the axle of the vehicle. The peg adjustment plate 23 selected also allows for the rear axle to be positioned more forward. The traction tube mount 24 pivotally connects the traction block 4 via the bracket arm 20 to the outer traction tube 22 via a bushing 36, and standard bolt, washer, and nut assembly 38.

It should be noted that while in the preferred embodiment the top and bottom plates are parallel to one another alternate embodiments could feature angled bottom plates to account for the pinion angle change, which results from higher lifts.

Figure 4:
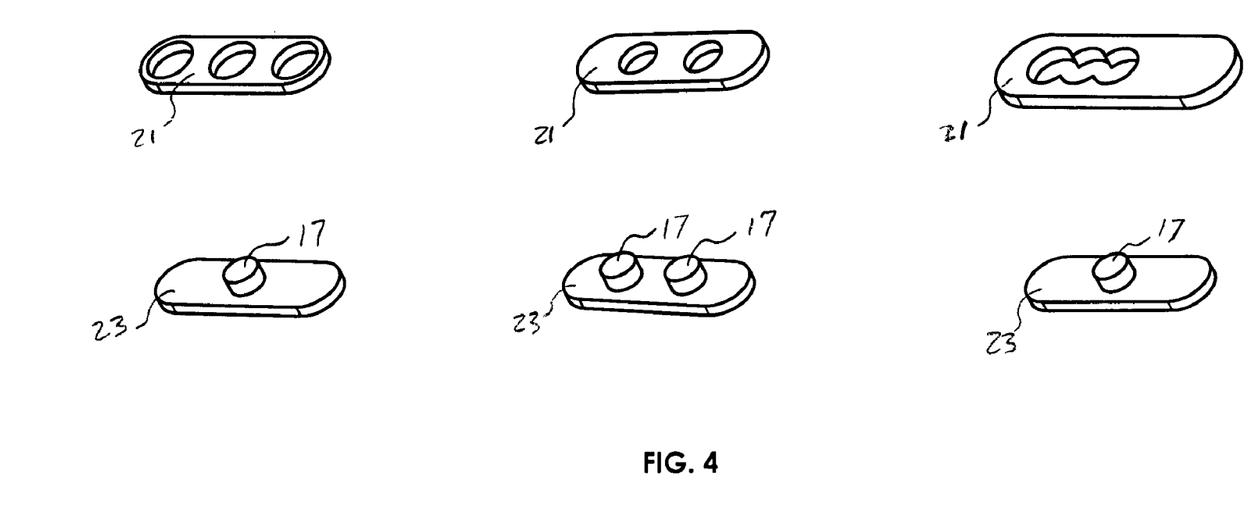
FIG. 4 is a perspective view of several possible embodiments of spring pin adjustment plates and peg adjustment plates.

FIG. 4 illustrates various embodiments of the spring pin adjustment plates 21 and peg adjustment plates 23. It should be noted that while the preferred embodiment employs the removable and interchangeable plate system for ease of fabrication it is well known by one skilled in the art that orifices to receive the spring pin could be drilled directly into the top of the traction block, and the peg (or pegs) could be affixed directly to the bottom of the traction block. It is known that the removable and interchangeable plate system could be employed on just this traction (spacer) block, without the traction tube assembly, or on any stand alone traction (spacer) block design to enable users to relocate the axle position with respect to the spring assembly.

Figure 5:
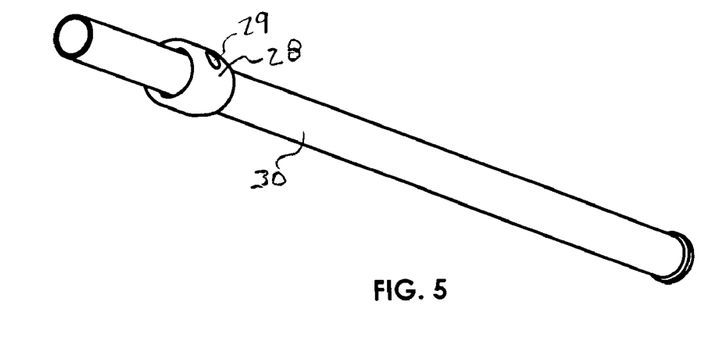
FIG. 5 is a perspective view of the inner traction tube and clamping coupler.
Figure 6:
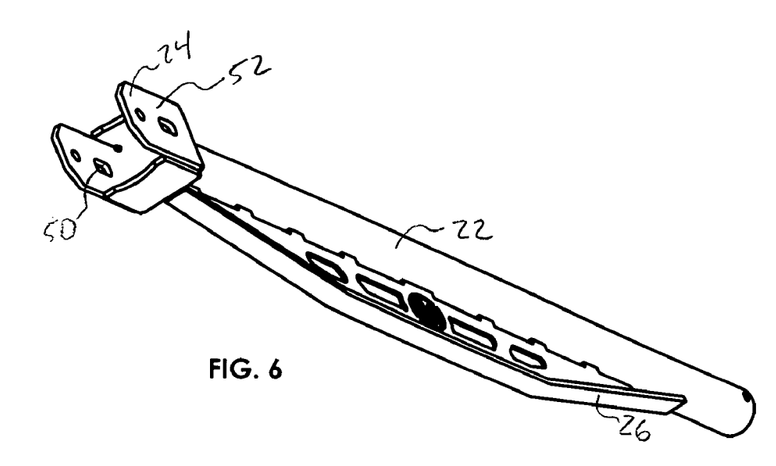
FIG. 6 is a perspective view of the outer traction tube.
Figure 7:
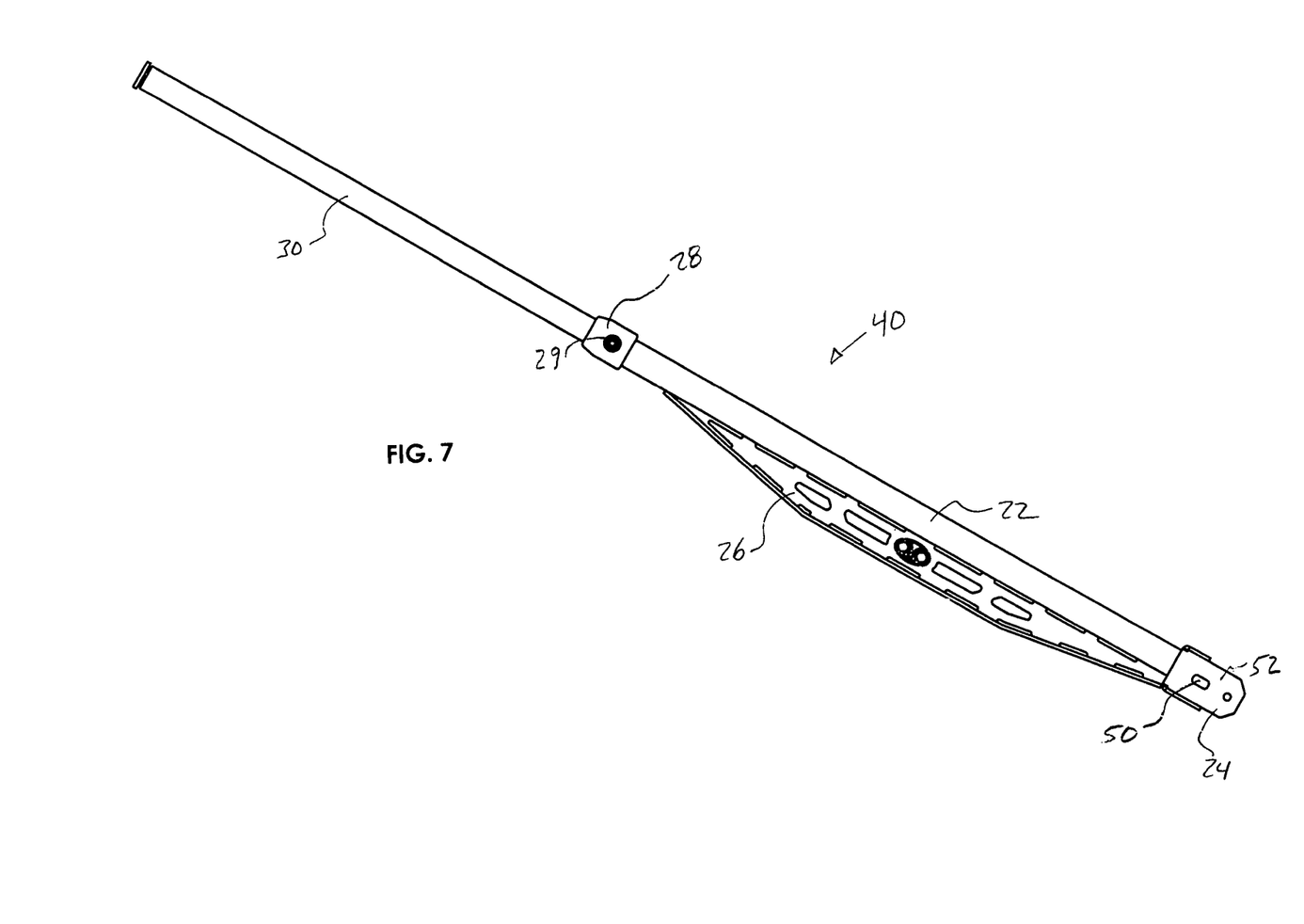
FIG. 7 is a side view of the traction tube assembly.

Looking at FIG. 5-7 the telescopic traction tubes can be seen. Inner traction tube 30 fits inside the outer traction tube 22 allowing for telescopic length adjustment of the traction tube assembly 40 (See FIG. 7). This is especially helpful with the various truck box lengths now available. Once the desired length is attained, inner traction tube 30 and outer traction tube 22 are locked together via the clamping coupler 28. The clamping coupler 28 sets the overall length of the traction tube assembly 40 through a compression fit between the inner tube 30 and the outer tube 22. This in essence, creates one rigid tube. The clamping coupler 28 frictionally fits over the outer tube 22 at the location where both the inner tube 30 and the outer tube 22 overlap. Once the desired length is set, a hole is drilled through both the outer tube 22 and inner tube 30 so as to align with the existing orifice 29 in the clamping coupler 28. A bolt (not shown) is tightened so as to deform slightly the inner tube 30 and outer tube 22 diameters such that the outer tube 22 is affixed into the inner tube 30 within the clamping coupler 28 locking the tube length. This is a modified method of achieving a compression fit. This feature makes this system a universal fit for long box or short box trucks.

Figure 8:
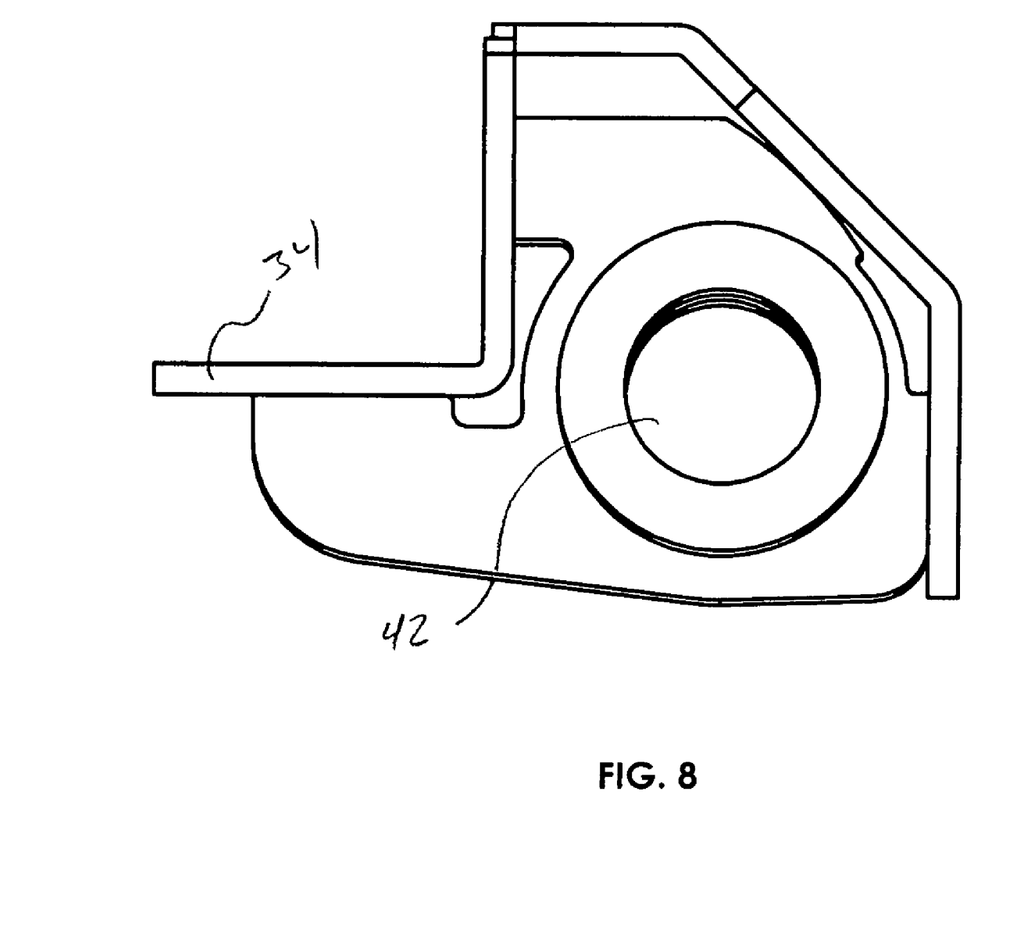
FIG. 8 is a perspective side view of the frame bracket.

FIG. 8. illustrates the L-shaped frame bracket 34 and the inner traction tube receiving orifice 42.

Figure 9:
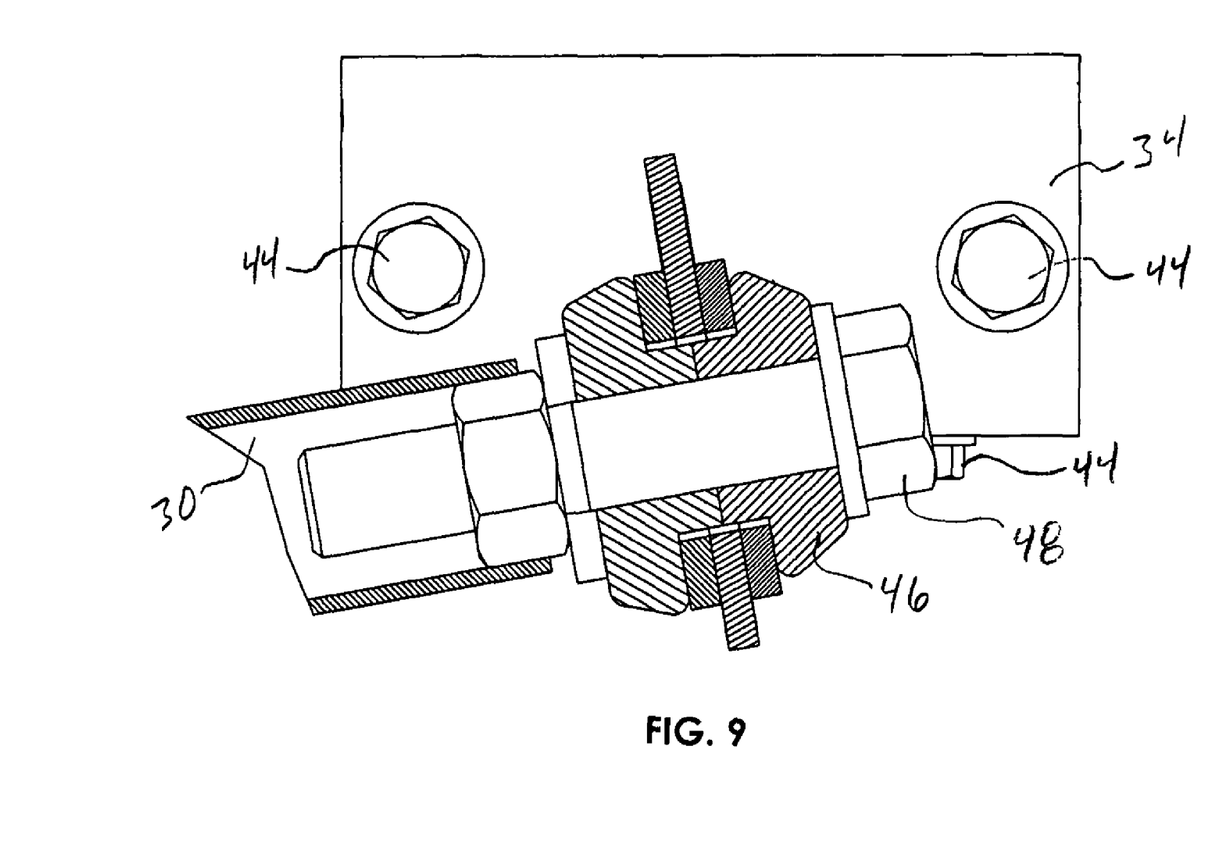
FIG. 9 is a partial cross-sectional view of the inner traction tube mounted in the frame bracket.

FIG. 9. is a partial cross-sectional view of the inner traction tube 30 mounted in the frame bracket 34. The frame bracket 34 mounts to the car frame (not visible) via four bolt, washer, and nut assemblies 44 (only three are visible in FIG. 9). The frame bracket 34 has a generally "L" shaped configuration so as to enable affixation to the bottom and side of the vehicle's frame rail 32 and to minimize twisting. The distal end of inner traction tube 30 is bolted to the frame bracket 34 by a mounting bolt 48. The mounting bolt 48 passes through the inner traction tube receiving orifice 42 and threadingly engages with inner tube mounting nut 25 which has been mechanically affixed to (or within, as illustrated in FIG. 9) the distal end of inner traction tube 30. The receiving orifice 22 is circumferentially lined with a polyurethane bushing 46. This bushing 46 allows for limited movement of the traction block assembly 2 and also serves to dampen any shock or vibration transmitted to the frame 32 of the vehicle.

In operation, the user selects a traction block assembly 2 with the desired traction block 4 height, and also selects the desired or appropriate spring pin adjustment plate 21 and peg adjustment plate 23.

The U-bolts 10 securing the axle 6 to the spring assembly 8 are removed and any existing spacer blocks between the axle and the spring assembly are removed. The traction block 4 section of the traction block assembly 2 is placed on top of the axle mount pad of the axle 6, aligning the peg 17 with the positioning orifice in the axle mount pad, and aligning the spring pin adjustment plate orifices 18 with the spring assembly 8 so as to enable the desired horizontal axle location. The U-bolts 10 partially encircle the axle 6 and are inserted through two orifices in the bottom plate 15, pass around the block, and through the four elongated orifices 16 in the top plate 14. (Note, that the bottom plate 15 and the top plate 14 overhang the block.) The U-bolt then passes beside the spring assembly 8 and through the upper bump-stop U-bolt bracket orifices 3 in the upper bump-stop U-bolt bracket 12, where a washer and nut assembly 11 are threadingly engaged on the ends of the U-bolts 10. This serves so as to constrain the block between the top of the axle mounting pad and the bottom on the spring assembly 8, as well as constraining the spring assembly 8 between the block's top plate 14 and the upper bump-stop U-bolt bracket 12. Frame bracket 34 is bolted to the frame 32. Now the distance from the frame bracket 34 to the traction block 4 can be measured, and the inner traction tube 30 in slid inside of outer traction tube 22 to the appropriate length. The orifices 50 in the side plates 52 of the traction tube mount 24 are aligned with the bushing 36 of the traction tube mount 24 and a bolt, washer, and nut assembly 38 pivotally connects the traction block 4 via the bracket arm 20 to the outer traction tube 22. The clamping coupler 28 is slid along the inner traction tube 30 and remains unsecured to the traction tube assembly 40 until the inner traction tube 30 is mounted into the frame bracket 34. Mounting nut 25 of traction tube 30 is brought in close proximity to the frame bracket 34. The mounting bolt 48 is inserted through the mounting orifice 42 in the mounting plate bushing 46 and threadingly engaged with the inner tube mounting nut 25. With the device now sized for the vehicle the clamping coupler 28 is slid down to the end of the outer traction tube 22 at the location where both the inner traction tube 30 and the outer tube 22 overlap and a hole is drilled through both the outer tube 22 and inner tube 30 so as to align with the existing orifice 29 in the clamping coupler 28. A bolt is tightened so as to deform slightly the inner traction tube 30 and outer traction tube 22 diameters such that the outer traction tube 22 is affixed into the inner tube 30 within the clamping coupler 28 locking the tube length.

In operation, axle wrap is kept to a minimum as the traction bar's rigidity counteracts the torque on the axle tube, thus preventing the leaf springs from excessively twisting up into an 'S' shape and then snapping back with the resulting loss of traction and wheel hop. Any pivoting motion required between the traction bar assembly 40 and the frame is accommodated by the frame bracket bushing 46 and the traction tube mount bushing 36 located at the proximate and distal ends of the traction bar assembly 40.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A vehicular length and height adjustable traction block assembly for maintaining a level drive height and mitigating axle wrap and wheel hop comprising:
    a spacer block;
    a length adjustable traction bar assembly having a proximate end and a distal end;
    an inner traction tube;
    an outer traction tube;
    a coupling sleeve;
    at least one bolted mechanical fastener;
    a frame mounting bracket; and
    a spacer block mounting bracket;
    wherein said spacer block is mechanically connected between a rear axle and a leaf spring suspension of a vehicle and pivotally connected at said proximate end of the traction bar assembly, and said distal end of the traction bar assembly is mechanically connected at a vehicle frame rail; and
    wherein said inner traction tube partially resides at a fixed depth within said outer traction tube held at said fixed depth by said at least one bolted mechanical fastener passing through aligned orifices formed therethrough said coupling sleeve, said outer traction tube and said inner traction tube, and wherein said spacer block mounting bracket is affixed to said proximate end of said traction bar assembly and said frame mounting bracket is affixed to said distal end of said traction bar assembly.

2. The traction block assembly of claim 1 wherein said outer traction tube has a linear stiffening member affixed to an outer surface thereof.

3. The traction block assembly of claim 2 wherein said frame mounting bracket has a L shaped member for mechanical attachment to said frame rail, and a traction bar mounting plate that extends normally from said L shaped member.

4. The traction block assembly of claim 3 wherein said distal end of said traction bar assembly has a nut therein that is threadingly engaged with a bolt passing through a flexible bushing frictionally constrained in a bushing orifice formed therethrough said traction bar mounting plate.

5. The traction block assembly of claim 4 wherein said spacer block is an L shaped boxed enclosure having a cantilevered top spring assembly mounting plate with four first U bolt orifices formed therethrough and a cantilevered bottom rear axle mounting plate with two second U bolt orifices formed therethrough, wherein said mounting plates are held in substantially parallel spaced configuration by two substantially similar and parallel L shaped side plates.

6. The traction block assembly of claim 5 wherein said spacer block further comprises;
    a pivot bushing passing through said spacer block boxed enclosure and aligned with pivot bolt orifices formed therethrough said side plates; and
    a pivot bolt adapted to reside therein said bushing.

7. The traction block assembly of claim 6 wherein said spacer block mounting bracket has two plates each with a pivot bolt opening formed therethrough and held in a substantially parallel configuration spaced to accept said spacer block side plates there between, and wherein said spacer block is connected to said traction bar by a pivot bolt that passes through said pivot bolt openings and said spacer block pivot bushing so as to allow pivotal motion between the spacer block and the traction bar.

8. The traction block assembly of claim 7 further comprising:
    two U bolt assemblies; and
    a generally planar spring clamping plate with four third U bolt orifices formed therethrough;
    wherein said spring clamping plate resides on a top side of said spring assembly wherein said U bolt assemblies pass around said rear axle and through said second, first and third U bolt orifices so as to sandwich said spacer block between said axle and a bottom side of said spring assembly.

9. The traction block assembly of claim 8 wherein said top spring assembly mounting plate has a first beveled orifice formed therethrough that is matingly conformed to accept a first beveled plate, such that when said first beveled plate is set into said first beveled orifice, said top spring assembly mounting plate remains a generally planar surface.

10. The traction block assembly of claim 9 wherein said cantilevered bottom rear axle mounting plate has a second beveled orifice formed therein that is matingly conformed to accept a second beveled plate, such that when said second beveled plate is set into said second beveled orifice said cantilevered bottom rear axle mounting plate remains a generally planar surface.

11. The traction block assembly of claim 10 wherein said second beveled plate has at least one axle mounting projection extending normally therefrom.

* * * * *